(12) United States Patent
    Sanghvi

(10) Patent No.: US 12,236,418 B2
(45) Date of Patent: Feb. 25, 2025

(54) BLOCKCHAIN-BASED SYSTEM FOR MANAGEMENT OF DIGITAL TOKENS

(71) Applicant: Bank of America Corporation, Charlotte, NC (US)

(72) Inventor: Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 18/096,333

(22) Filed: Jan. 12, 2023

(65) Prior Publication Data

US 2024/0242204 A1    Jul. 18, 2024

(51) Int. Cl.
    *G06Q 20/36*   (2012.01)
    *G06Q 20/38*   (2012.01)
    *G06Q 99/00*   (2006.01)

(52) U.S. Cl.
    CPC ..... *G06Q 20/3672* (2013.01); *G06Q 20/3827* (2013.01); *G06Q 99/00* (2013.01)

(58) Field of Classification Search
    CPC .......... G06Q 20/3672; G06Q 20/3827; G06Q 99/00; G06Q 2220/00; H04L 9/3239; H04L 9/50
    USPC ......................................................... 705/66
    See application file for complete search history.

(56) References Cited

U.S. PATENT DOCUMENTS

| | | | |
|---|---|---|---|
| 10,984,016 B2 | 4/2021 | Gunther | |
| 11,062,407 B2 | 7/2021 | Cheng-Shorland et al. | |
| 2019/0311447 A1 | 10/2019 | Strnad, II | |
| 2020/0059364 A1* | 2/2020 | Konda | H04L 63/123 |
| 2020/0112833 A1* | 4/2020 | Cheong | G06Q 20/3224 |
| 2020/0184466 A1* | 6/2020 | Sarin | G06Q 20/405 |
| 2021/0020683 A1* | 1/2021 | Ito | H04N 1/0009 |
| 2021/0090189 A1 | 3/2021 | Blackman et al. | |
| 2022/0335418 A1 | 10/2022 | Demarinis et al. | |
| 2024/0111880 A1* | 4/2024 | Redlich | G06F 21/602 |

FOREIGN PATENT DOCUMENTS

| | | |
|---|---|---|
| CN | 110620810 B | 3/2022 |
| KR | 102377651 B1 | 3/2022 |
| WO | 2015024129 A1 | 2/2015 |

\* cited by examiner

*Primary Examiner* — Zeshan Qayyum
(74) *Attorney, Agent, or Firm* — Banner & Witcoff, Ltd.

(57) ABSTRACT

Aspects of this disclosure relate to a blockchain system for management, splitting, and transfer of tokens. In an arrangement, splitting of a token may comprise splitting the blockchain by adding blocks, comprising the new tokens, to reference a same block of the blockchain. In an arrangement, an old token may be burned by associating the token to a predetermined wallet identifier.

20 Claims, 6 Drawing Sheets

BLOCKCHAIN-BASED SYSTEM FOR MANAGEMENT OF DIGITAL TOKENS

TECHNICAL FIELD

Aspects of the disclosure relate to blockchain-based systems, and more specifically, to use of blockchain tokens for tracking, modifying, or transferring digital tokens.

BACKGROUND

Blockchain-based technologies have seen increasing use for a wide range of applications. Secure, immutable, and distributed storage of information, and decentralized validation are some of the aspects that have led to increasing adoption of these technologies across a range of application areas. The most widespread and visible application of blockchains is in the domain of crypto-currency. However, the technology may be used for any application where decentralized and distributed operation is desirable.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues associated with management of blockchain systems for storage of digital tokens. One or more of the aspects herein are described with reference to use of blockchains for digital tokens for asset ownership, transfer, and/or management. Additional aspects described herein may relate to the use of smart contracts for transferring and/or splitting of asset tokens.

In accordance with one or more arrangements, a computing platform comprising a processor and memory storing computer-readable instructions may perform, based on execution of the instructions one or more processes. The computing platform may receive, from a computing device, metadata associated with an asset. The metadata may comprise at least an asset identifier. The computing platform may generate a first token comprising the metadata and a first wallet identifier. The computing platform may create a block, for inclusion into a blockchain, wherein the creating the block may comprise hashing at least the first token and a previous hash value of a first immediately preceding block in the blockchain to generate a first hash value. The computing platform may the add the block to the blockchain. The computing platform may receive, from the computing device, an indication of an asset split, wherein the indication of the asset split may comprise at least the asset identifier. The computing platform may generate at least two tokens, wherein: a second token, of the at least two tokens, may comprises the asset identifier and a second wallet identifier, and a third token, of the at least two tokens, comprises the asset identifier and a third wallet identifier. The computing platform may create at least two blocks, for inclusion into the blockchain. The creating the at least two blocks may comprises: hashing the second token and a second previous hash value of a second immediately preceding block in the blockchain to generate a second hash value, and hashing the third token and a second previous hash value of the second immediately preceding block in the blockchain to generate a third hash value. The computing platform may add the at least two blocks to the blockchain. The computing platform may receive a request for wallet identifiers associated with the asset identifier. The computing platform may, based on querying the blockchain and further based on retrieving the second token and the third token from the at least two blocks, send indications of the second wallet identifier and the third wallet identifier.

In at least some arrangements, the creating the at least two blocks may further comprise including, within each of the at least two blocks, an indication of an association between the first token and a fourth wallet identifier. The computing platform may, based on querying the blockchain and based on determining the first token is associated with the fourth wallet identifier, not send indications of the first wallet identifier and the fourth wallet identifier.

In at least some arrangements, an immediately preceding block may be a current latest block of the blockchain.

In at least some arrangements, the computing platform may be associated with a node in a network comprising a plurality of nodes. The adding the block to the blockchain may comprise sending the block for addition to respective local copies of blockchains in the plurality of nodes.

In at least some arrangements, the metadata may further comprise one or more of a loan value, an interest rate, and an asset percentage.

In at least some arrangements, the generating the at least two tokens and the creating the at least two blocks may be based on execution of a smart contract stored in the blockchain In at least some arrangements, the block may comprise a nonce value that, when hashed with a digest that combines the first token and the hash value of the first immediately preceding block, generates the first hash value comprising a predetermined number of consecutive alphanumerical characters at a predetermined position.

These features, along with many others, are discussed in greater detail below.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

The disclosure provided herein is described, at least in part, in relation to a computing system specialized for the purpose of managing a blockchain. The computing system may be a centralized or a decentralized peer-to-peer (e.g., P2P) system. A decentralized P2P system may be comprised of computing devices (e.g., multiple nodes) that are distributed in multiple locations across a geographical area (as opposed to a single location such as a business or company). The computing devices/nodes may be associated with different businesses or companies. A centralized computing system may comprise of computing device(s)/server(s) that may be associated with a single company and which may operate as a single node. The computing device(s) may manage a blockchain, which may be a data structure used to store information related to the system. More specifically, the blockchain may be a chronological linkage of data elements (e.g., blocks) which store data records relating to the computing system.

A user may access the computing system through a specialized "wallet" that serves to uniquely identify the user and enable the user to perform various functions. Through the wallet, the user may be able to hold tokens, funds, or any other asset in the blockchain. Furthermore, the user may be able to use the wallet to request performance of network-specific functions such as fund, token, and/or asset transfers. An administrative user may also access the computing system to issue tokens, burn tokens, split tokens, and/or the like, on behalf of one or more users. The computing device(s) forming the computing system may perform network-specific functions requested by the user or administrative user. In some arrangements, the network-specific functions may be performed in accordance with smart contract operations as programed within the blockchain. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

A token may represent a unit of cryptocurrency as recorded by the blockchain or may be used to store any other type of information in the blockchain. The blockchain may record a balance sheet transaction. For example, a user may have a wallet which reflects that the user has five tokens associated with the blockchain. The user may provide a request to transfer the five tokens to a user or an enterprise organization (e.g., a banking institution) who may also have a wallet. One or more computing devices forming the computing system may perform the request and transfer the five tokens from the wallet of the user to the wallet of the enterprise organization. In doing so, a block may be created by computing device(s) of the computing system. The block may store data indicating that the five tokens were transferred from the wallet of the user to the wallet of the enterprise organization. The computing device(s) may add the block to the blockchain. At such a point, the wallet of the user may reflect the transfer of the five tokens to the wallet of the enterprise organization, and may indicate a balance of zero. The wallet of the enterprise organization, however, may also reflect the transfer of the five tokens and may have a balance equal to a sum of five tokens and an initial balance.

In more detail, the computing system may be specialized for the purpose of managing a distributed ledger, such as a private blockchain or a public blockchain, through the implementation of digital cryptographic hash functions, consensus algorithms, digital signature information, and network-specific protocols and commands. The computing system may comprise one or more computing devices, either of a heterogeneous or homogenous type, which serve as network node(s) (e.g., full nodes and/or lightweight nodes) to create and sustain computing network (e.g., a centralized or a decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions in a decentralized network, such as balance sheet transactions and smart contract operations, one or more full nodes forming the computing network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols. In centralized networks, a single full node may perform the balance sheet transaction and/or smart contract operation, and record the transactions or operations within the blockchain.

A "private blockchain" may refer to a blockchain in which only authorized computing devices are permitted to act as node(s) and have access to the private blockchain. In some instances, the private blockchain may be viewable and/or accessible by authorized computing devices which are not participating as node(s) within the private network, but still have proper credentials. The private blockchain may be centralized (e.g., comprising a single node associated with an enterprise organization) or may be decentralized (e.g., comprising a plurality of nodes associated with multiple enterprise organizations). A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

While in practice the term "blockchain" may hold a variety of contextually derived meanings, the term blockchain, as used herein, refers to a concatenation of sequentially dependent data elements (e.g., blocks) acting as a data ledger that stores records relating to a computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference, among others.

Various examples herein describe the use of tokens for storing a record of asset ownership, loan payments, and/or the like, in the blockchain. The blockchain, and its associated computing network/devices, may also be used to record/execute smart contracts for the purposes of managing automatic payments, generating, splitting, transfer and/or burning tokens recording property ownership. The blockchain may also be used to record know your customer (KYC) checks, and make the checks available to one or more other organizations that may be a part of a decentralized computing system associated with the blockchain.

Figure 1A:
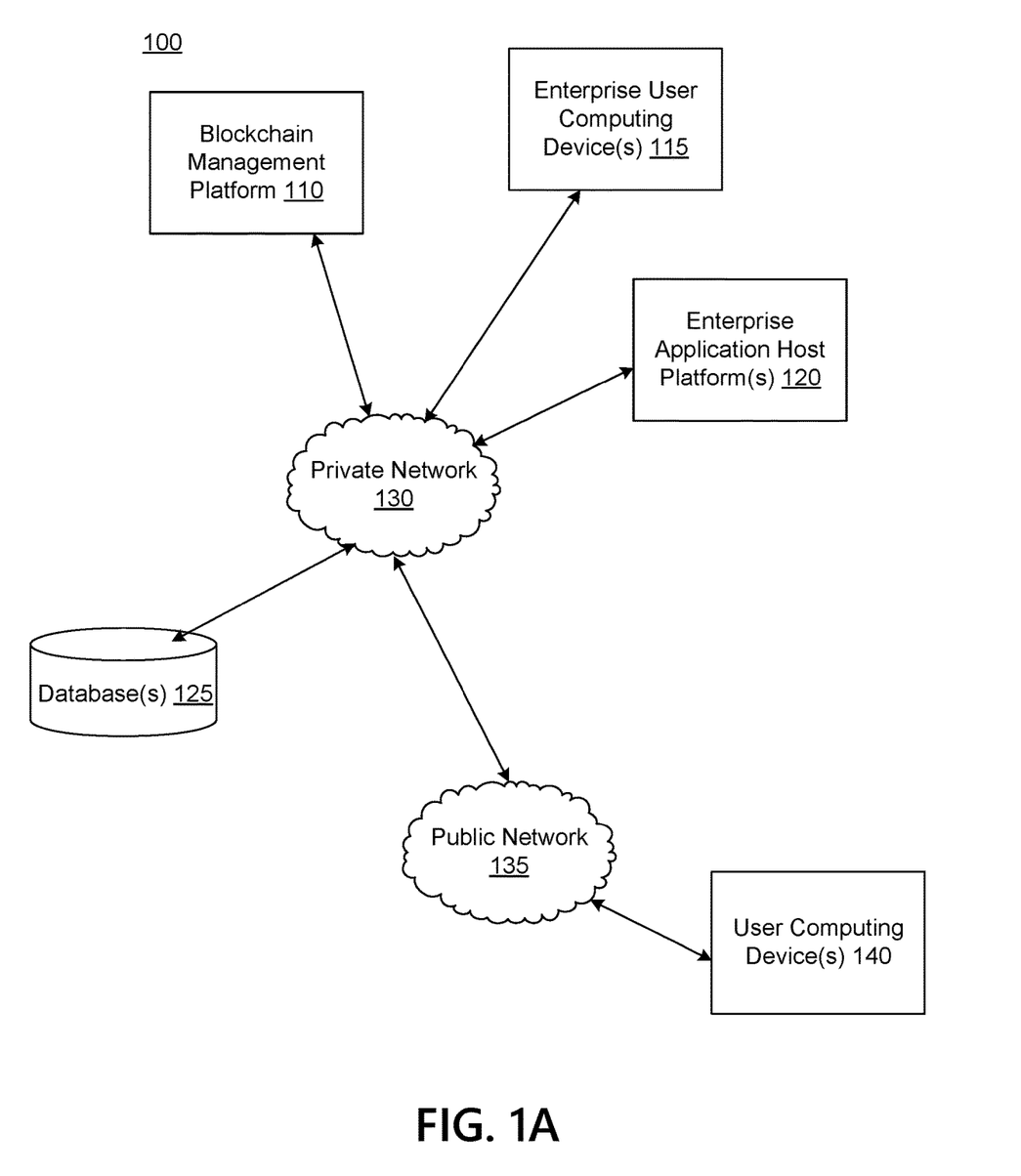
FIG. 1A shows an illustrative computing environment for blockchain management, in accordance with one or more example arrangements.

FIG. 1A shows an illustrative computing environment 100 for blockchain management, in accordance with one or more arrangements. The computing environment 100 may comprise one or more devices (e.g., computer systems, communication devices, and the like). The computing environment 100 may correspond to a centralized network for blockchain management. The one or more devices may be connected via one or more networks (e.g., a private network 130 and/or a public network 135). For example, the private network 130 may be associated with an enterprise organization (e.g., a banking institution) which may provide mortgage, asset management, and asset purchase/sale services for its clients. The computing environment 100 may comprise, for example, a blockchain management platform 110, one or more enterprise user computing device(s) 115, one or more enterprise application host platform(s) 120, and/or a database 125 connected via the private network 130. Additionally, the computing environment 100 may comprise one or more external computing systems 140 connected, via the public network 135, to the private network 130. Devices in the private network 130 and/or authorized devices in the public network 135 may access services, applications, and/or systems provided by the enterprise application host platform 120 and supported/serviced/maintained by the blockchain management platform 110.

The devices in the computing environment 100 may transmit/exchange/share information via hardware and/or software interfaces using one or more communication protocols over the private network 130 and/or the public network 135. The communication protocols may be any wired communication protocol(s), wireless communication protocol(s), one or more protocols corresponding to one or more layers in the Open Systems Interconnection (OSI) model (e.g., a local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), and the like).

The blockchain management platform 110 may comprise one or more computing devices and/or other computer components (e.g., processors, memories, communication interfaces) configured to perform one or more functions as described herein. Further details associated with the architecture of the blockchain management platform 110 are described with reference to FIG. 1B.

The enterprise application host platform 120 may comprise one or more computing devices and/or other computer components (e.g., processors, memories, communication interfaces). In addition, the enterprise application host platform 120 may be configured to host, execute, and/or otherwise provide one or more services/applications for the end users. The end users may be employees associated with the enterprise organization, or may be consumers of a product/service provided by the enterprise organization. For example, if the computing environment 100 is associated with a financial institution, the enterprise application host platform 120 may be configured to host, execute, and/or otherwise provide one or more transaction processing programs (e.g., online banking applications, fund transfer applications, electronic trading applications), loan processing/dispersing programs, and/or other programs associated with the financial institution. The above are merely exemplary use-cases for the computing environment 100, and one of skill in the art may easily envision other scenarios where the computing environment 100 may be utilized to provide and support end-user applications.

The enterprise user computing device(s) 115 may be personal computing devices (e.g., desktop computers, laptop computers) or mobile computing devices (e.g., smartphones, tablets). In addition, the enterprise user computing device(s) 115 may be linked to and/or operated by specific enterprise users (who may, for example, be employees or other affiliates of the enterprise organization).

The database 125 may store data associated with assets for which loans has been services/provided by the financial institution. For example, the database 125 may include a blockchain ledger comprising a plurality of blocks. As further described herein, each of the blocks may store identification data associated with a client, identification data of a property as purchased by the client, a loan amount as provided to the client, a purchase value of an asset as purchased by the client using the loan, a loan rate as provided to the client, other property details (e.g., address, property identifier (ID)), etc. In an arrangement, the database may also comprise a mapping between a property ID and a physical address associated with the property identifier. In an arrangement, the database may also comprise a mapping between wallet identifiers (e.g., public keys) and clients (e.g., names) associated with the wallet identifiers. The blocks may also be used to store smart contracts (e.g., as generated by the blockchain management platform 110, or as submitted via the enterprise user computing device 115).

The user computing device(s) 140 may be connected, via the public network 135, to the blockchain management platform 110 (and other devices in the private network 130). The user computing device(s) 140 may be associated with clients, and may be used to query the blockchain to determine details associated with the loan (e.g., interest rate, outstanding balance) and/or to facilitate loan repayments to the financial institution. The loan repayments may be in the form of cryptocurrency (e.g., as managed by/stored within the blockchain) and/or via a regular checking/savings account (e.g., as managed by the financial institution). In addition, the user computing device(s) 140 may be used to avail various services as offered by the financial institution (e.g., online banking, credit card services, etc.). In an arrangement, the enterprise user computing device(s) 115 and the user computing device(s) 140 may correspond to lightweight network nodes while the blockchain management platform 110 may correspond to a full node.

In one or more arrangements, the blockchain management platform 110, the database 125, the enterprise user computing device(s) 115, the enterprise application host platform(s) 120, the computing device(s) 140, and/or the other devices/systems in the computing environment 100 may be any type of computing device capable of receiving input via a user interface, and communicating the received input to one or more other computing devices in the computing environment 100. For example, the blockchain management platform 110, the database 125, the enterprise user computing device(s) 115, the enterprise application host platform(s) 120, the computing device(s) 140, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the blockchain management platform 110, the database 125, the enterprise user computing device(s) 115, the enterprise application host platform(s) 120, the computing device(s) 140, and/or the other devices/systems in the computing environment 100 may, in some instances, be and/or comprise special-purpose computing devices configured to perform specific functions.

Figure 1B:
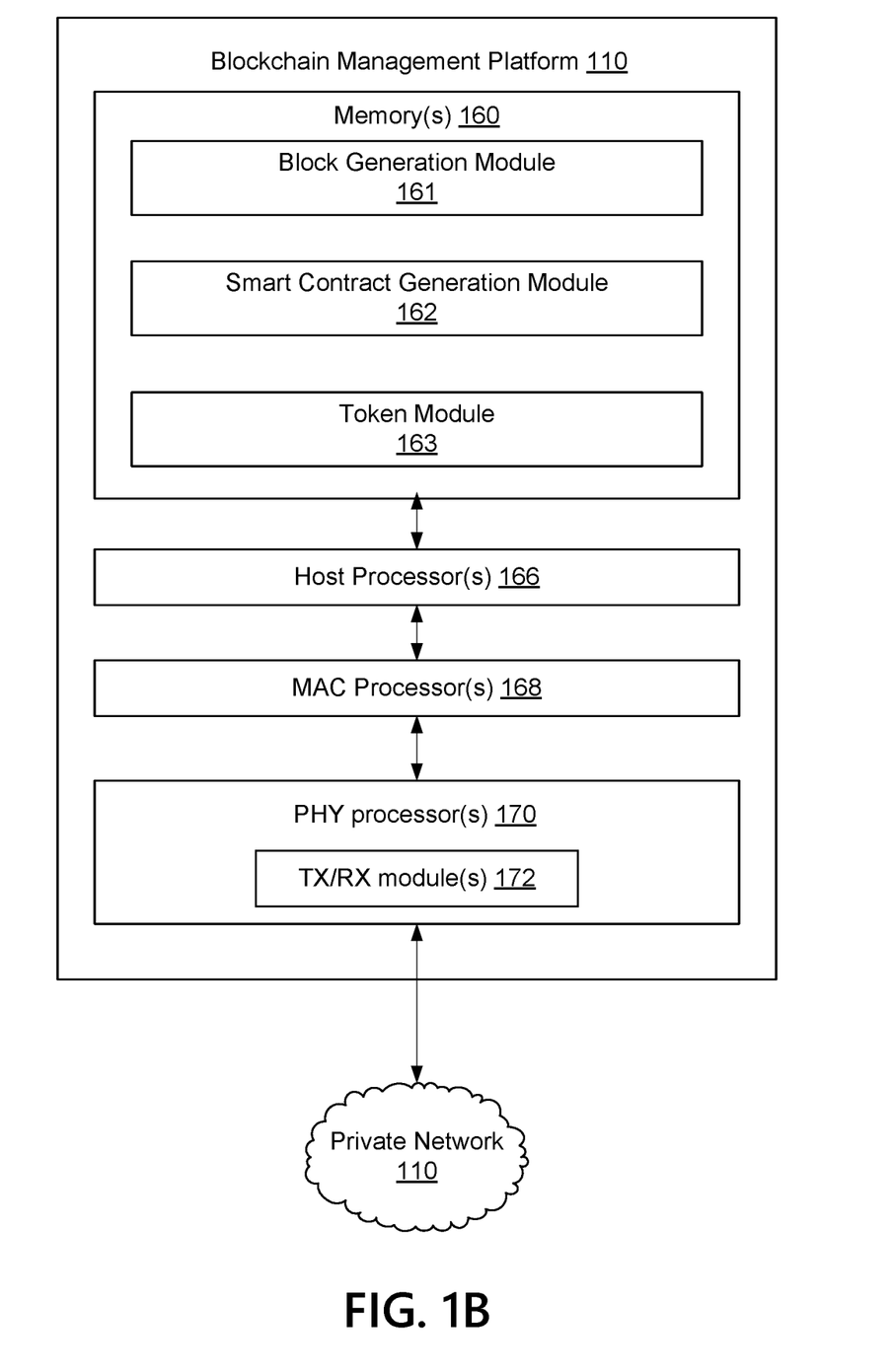
FIG. 1B shows an example blockchain management platform, in accordance with one or more example arrangements.

FIG. 1B shows an example blockchain management platform 110, in accordance with one or more examples described herein. The blockchain management platform 110 may comprise one or more of host processor(s) 166, medium access control (MAC) processor(s) 168, physical layer (PHY) processor(s) 170, transmit/receive (TX/RX) module(s) 172, memory 160, and/or the like. One or more data buses may interconnect host processor(s) 166, MAC processor(s) 168, PHY processor(s) 170, and/or Tx/Rx module(s) 172, and/or memory 160. The blockchain management platform 110 may be implemented using one or more integrated circuits (ICs), software, or a combination thereof, configured to operate as discussed below. The host processor(s) 166, the MAC processor(s) 168, and the PHY processor(s) 170 may be implemented, at least partially, on a single IC or multiple ICs. Memory 160 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 168 and/or the PHY processor(s) 170 of the blockchain management platform 110 may be configured to generate data units, and process received data units, that conform to any suitable wired and/or wireless communication protocol. For example, the MAC processor(s) 168 may be configured to implement MAC layer functions, and the PHY processor(s) 170 may be configured to implement PHY layer functions corresponding to the communication protocol. The MAC processor(s) 168 may, for example, generate MAC data units (e.g., MAC protocol data units (MPDUs)), and forward the MAC data units to the PHY processor(s) 170. The PHY processor(s) 170 may, for example, generate PHY data units (e.g., PHY protocol data units (PPDUs)) based on the MAC data units. The generated PHY data units may be transmitted via the TX/RX module(s) 172 over the private network 130. Similarly, the PHY processor(s) 170 may receive PHY data units from the TX/RX module(s) 172, extract MAC data units encapsulated within the PHY data units, and forward the extracted MAC data units to the MAC processor(s). The MAC processor(s) 168 may then process the MAC data units as forwarded by the PHY processor(s) 170.

One or more processors (e.g., the host processor(s) 166, the MAC processor(s) 168, the PHY processor(s) 170, and/or the like) of the blockchain management platform 110 may be configured to execute machine readable instructions stored in memory 160. The memory 160 may comprise one or more program modules/engines having instructions that when executed by the one or more processors cause the blockchain management platform 110 to perform one or more functions described herein. The one or more program modules/engines and/or databases may be stored by and/or maintained in different memory units of the blockchain management platform 110 and/or by different computing devices that may form and/or otherwise make up the blockchain management platform 110. For example, the memory 160 may have, store, and/or comprise a block generation module 161, a smart contract generation module 162, and/or a token module 163.

The block generation module 161 may generate blocks for addition to a blockchain. For example, the block generation module 161 may receive tokens (e.g., as generated by the token module), or smart contracts (e.g., as generated by the smart contract generation module 162) and generate a block comprising tokens/smart contracts. The generated block may be linked to a previous block in the blockchain based on a hash value (e.g., generated based on a digital cryptographic hash function) of the previous block. For example, the generated block may comprise, as a block header, the hash value of the previous block. In embodiments where the blockchain also stores a ledger of cryptocurrency transactions, the generated block may also include indications of cryptocurrency transfers between different wallets maintained by the blockchain.

The smart contract generation module 162 may be used to create smart contracts for processing various transactions relating to loan repayments. For example, a client may set up an autopay mechanism whereby cryptocurrency (as stored in a wallet associated with the client) may be automatically transferred to the financial institution as part of the loan repayments. The smart contract generation module 162 may generate a smart contract that, when executed, processes periodic transfer of cryptocurrency from the wallet of the client to a wallet associated with the financial institution. In an arrangement, the periodicity of payments, payment amounts, and number of payments may be indicated via/received from the enterprise user computing device 115 or the user computing device 140. The smart contract generation module 162 may generate a smart contract based on the received information and store it within the blockchain.

The token module 163 may generate, burn, split, tokens associated with clients for which the blockchain management platform 110 manages asset/property ownership. For each asset, the token module 163 may generate a token that may indicate one or more of: wallet ID of a client associated with the asset, a value of a loan value provided to the client, a value of the asset, an interest rate provided by the client for the purchase of the asset, an address/location of the asset, a percentage of ownership of the asset, and/or the like. The generated tokens may be stored in the form of blocks within the blockchain (e.g., by the block generation module 161).

While FIG. 1A illustrates the blockchain management platform 110, the enterprise user computing device(s) 115, the enterprise application host platform 120, and the database 125 as being separate elements connected in the private network 130, in one or more other arrangements, functions of one or more of the above may be integrated in a single device/network of devices. For example, elements in the blockchain management platform 110 (e.g., host processor(s) 166, memory(s) 160, MAC processor(s) 168, PHY processor(s) 170, TX/RX module(s) 172, and/or one or more program/modules stored in memory(s) 160) may share hardware and software elements with and corresponding to, for example, the enterprise application host platform 120 and/or the enterprise user device(s) 115.

Figure 2:
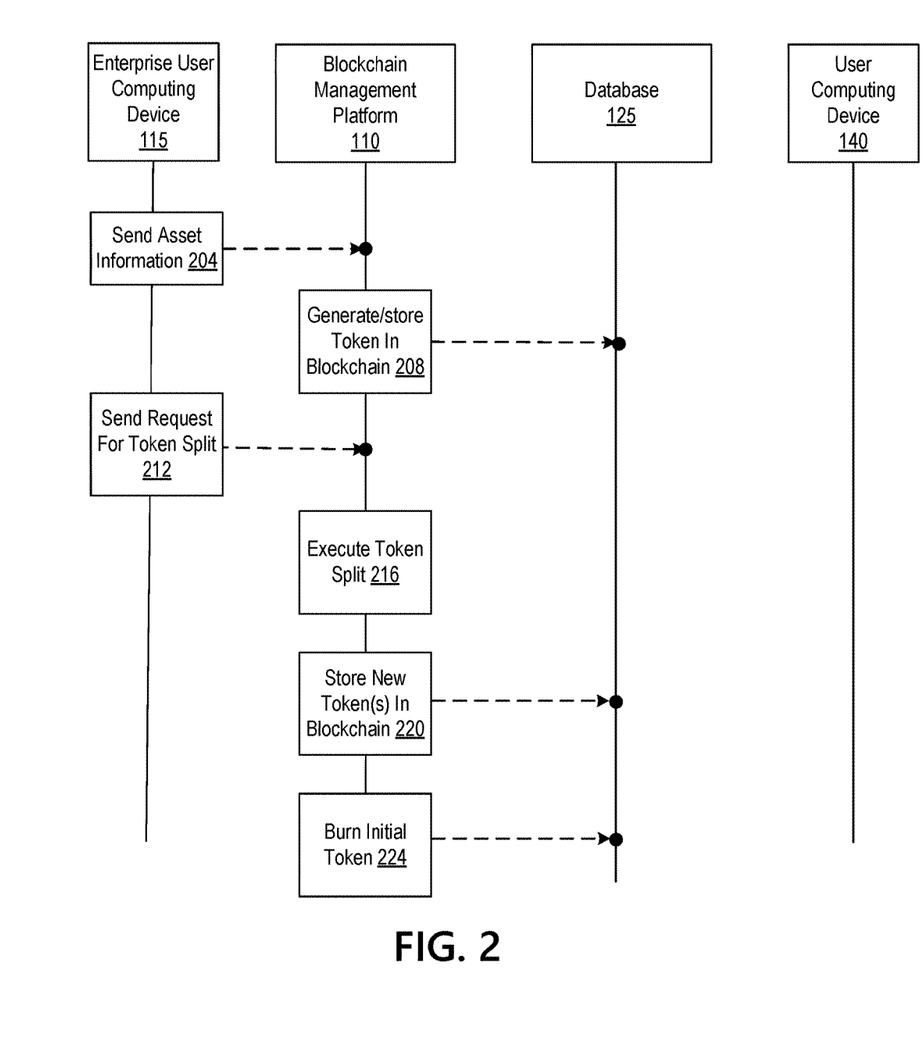
FIG. 2 shows an event sequence for blockchain management, in accordance with one or more example arrangements.

FIG. 2 shows an event sequence for blockchain management, in accordance with one or more example arrangements. Procedure associated with the example event sequence may be performed by one or more devices within the computing environment 100. The example event sequence of FIG. 2 may be used for generation of a new token for an asset and subsequently splitting the asset (e.g., following a sale transaction to transfer the asset to new clients).

At step 204, the enterprise user computing device 115 may send (e.g., transmit), to the blockchain management platform 110, asset information. The asset information may comprise metadata associated with an asset being purchased (e.g., by a client) and/or recorded in the blockchain. The metadata may comprise one or more of an asset identifier, a loan value used for asset purchase by the client, an interest rate, and/or the like. The enterprise user computing device 115 may additionally send an identifier (e.g., wallet identifier) associated with the client. In arrangements where the asset is being purchased by multiple clients, the metadata may further comprise an indication of a percentage of the asset that is being assigned to the client.

At step 208, the blockchain management platform 110 may generate a token, for inclusion into the blockchain. The token may comprise the metadata and the wallet identifier. The blockchain management platform 110 may generate a block, comprising the token, for inclusion into the blockchain. The block may additionally comprise a hash value of a latest block in the blockchain. For example, the generated block may comprise, as a block header, the hash value of the latest (e.g., previous) block as currently stored in the blockchain. Generating the block may further comprise hashing the block to generate a hash value for the block, and appending the hash value to the block. The blockchain management platform 110 may send the block to the database 125 for storage.

At step 212, the enterprise user computing device 115 may send a request for splitting the token to the blockchain management platform 110. The request may be sent in relation to the asset being purchased, by a plurality of buyers, from the client. The request may comprise metadata for each of the buyers and the asset identifier. The metadata may comprise one or more of the asset identifier, a loan value used for asset purchase by a buyer, an interest rate for the buyer, and/or the like. Further, metadata for each of the buyers may comprise a percentage of the asset ownership as assigned to each of the buyers. The enterprise user computing device 115 may additionally send an identifier (e.g., wallet identifier) associated with the client (e.g., the previous owner/seller).

At step 216, the blockchain management platform 110 may execute a token split in response to receiving the request from the enterprise user computing device 115. Executing the token split may comprise generating multiple new tokens, with each new token associated with the corresponding buyer. Each of the new tokens may comprise the asset identifier, a corresponding wallet identifier of the buyer, a percentage ownership of the asset for the buyer, and/or other metadata (e.g., as described above with respect to step 204). In some arrangements, each of the new tokens may additionally comprise the wallet identifier(s) of the previous owner(s) of the asset, allowing ownership to be tracked across multiple transfers.

At step 220, the blockchain management platform 110 may generate new blocks, corresponding to each of the new tokens, for inclusion into the blockchain. Each of the blocks may comprise, as block headers, a hash value of the last block (e.g., an immediately preceding block, latest block as currently stored in the blockchain) in the blockchain. Generating a new block may comprise hashing at least a new token and the hash value of the last block in the blockchain to generate a new hash value.

For example, consider an example where the token is split into two tokens for asset purchase by two buyers. The blockchain management platform 110 may generate two new blocks, with each block comprising a corresponding new token. Each of the new block may comprise the same hash value of the last block in the blockchain. The blockchain management platform 110 may hash a first block (e.g., comprising a first new token and the hash value of the last block in the blockchain) to generate a first hash value. The blockchain management platform 110 may append the first hash value to the first block. The blockchain management platform may hash a second block (e.g., comprising a second new token and the hash value of the last block in the blockchain) to generate a second hash value. The blockchain management platform 110 may append the second hash value to the first block. The blockchain management platform 110 may send the new blocks to the database 125 for storage.

At step 224, the blockchain management platform 110 may execute a token burn for the initial token generated for the asset (e.g., at step 208). Executing the token burn may comprise generating a new block comprising the token and an indication of a predefined wallet identifier. The new block may be added to the blockchain. In an arrangement, the token and the indication of the predefined wallet identifier may be included in the new blocks (e.g., as generated at step 220). The predefined wallet identifier may be associated with a wallet from which no transfers can be performed to other wallets. In this manner, the token would no longer be available to be transferred to any other wallets, and the token is effectively locked out from use.

To query the current ownership of an asset, a computing device (e.g., the enterprise user computing device 115, or the user computing device 140) may query the blockchain using an asset identifier. For example, the computing device may scan the blockchain to find the latest block comprising a token which indicates or is associated with the asset identifier. The computing device may identify a wallet identifier as indicated in the token to determine the current ownership of the asset. The database may also comprise a mapping between the wallet identifiers and names corresponding to asset buyers and sellers as tracked by the blockchain. The database may be used to determine, by the computing device, a name associated with the asset.

In at least some arrangements, one or more operations as described above (e.g., generation of tokens and/or blocks associated with token split, token burn, token issue, etc.) may be caused by execution of smart contracts (e.g., as stored in the blockchain) by the blockchain management platform 110. For example, the blockchain management platform 110, in response to incoming requests (e.g., token issue, token split, token burn, etc.) from the enterprise user computing device 115, may retrieve a smart contract corresponding to the requested operation, and execute the smart contract to add new blocks to the blockchain.

In an arrangement, the blockchain management platform 110 may retrieve and execute a smart contract from the blockchain as stored in the database 125 for performing the one or more operations.

Figure 3:
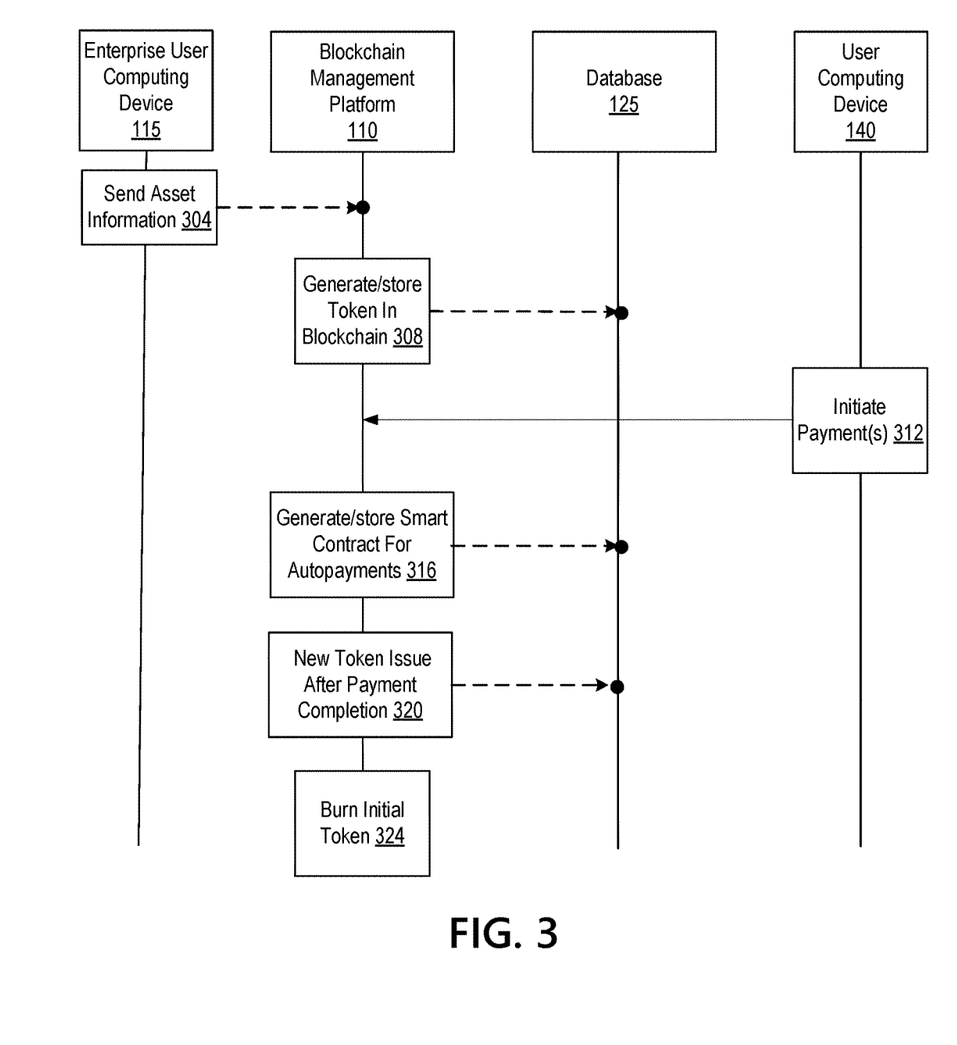
FIG. 3 shows an event sequence for blockchain management, in accordance with one or more example arrangements.

FIG. 3 shows an event sequence for blockchain management, in accordance with one or more example arrangements. Procedure associated with the example event sequence may be performed by one or more devices within the computing environment 100. The example event sequence of FIG. 2 may be used for generation of a new token for an asset and smart contracts for managing autopayments.

Steps 304 and 308 may be substantially similar to steps 204 and 208 as described above with respect to FIG. 2, and may be used to generate and store a new token recording an asset purchase. At step 312, a user (e.g., an asset owner) may initiate a payment (e.g., a mortgage payment) associated with the asset. Initiating a payment may comprise setting up an automatic payment for the asset. Initiating a payment may comprise performing a one time payment transaction for the asset.

The payment may be may via an electronic fund transfer. For example, the user computing device 140 may send a request for a fund transfer, from a user account (e.g., as managed by the enterprise application host platform 120) to an account associated with the lender (e.g., which may be financial institution associated with the private network 130). The user computing device 140 may send the request to the enterprise application host platform 120 to process the electronic fund transfer.

In another arrangement, the user computing device 140 may send (e.g., to the blockchain management platform 110) a request for a cryptocurrency transfer, from a wallet associated with the user, to a wallet associated with the lender. In an arrangement, and in accordance with known protocols of cryptocurrency transfers, a block may be generated recording the cryptocurrency transfer from the user wallet to the wallet associated with the lender. The block indicating a record of this transfer may be stored in the blockchain.

In another arrangement, the user computing device 140 may be used to set up (e.g., by the user) an automatic payment mechanism using the blockchain management platform 110. The user computing device 140 may send, to the blockchain management platform 110, an indication of the asset identifier, a periodicity of payments, a total number of payments, a user wallet identifier, a lender wallet identifier, a user banking account, a lender banking account, and/or a value of cryptocurrency/regular currency to be paid per payment.

At step 316, the blockchain management platform 110 may generate a smart contract for executing the automatic payments as requested by the user. The smart contract, when executed may, may cause cryptocurrency transfer from a wallet associated with the user to the wallet associated with the lender. The transfer may be periodic with a periodicity specified in the smart contract. The transfer value of the cryptocurrency may also be specific by the smart contract. The smart contract may additionally comprise steps relating to a determination of cryptocurrency funds in the user account. If the funds are insufficient for a payment, the smart contract may cause execution of steps relating to processing an electronic fund transfer from a user banking account to a lender banking account. To that effect, the user banking account and lender banking account may also be specified in the smart contract. The generated smart contract may be stored in a block in the blockchain and stored in the database 125. The blockchain management platform 110 may trigger execution of the smart contract for processing the payment at a periodicity defined within the smart contract.

At step 320, the blockchain management platform 110 may determine whether all payments relating to the asset have been made by the user. For example, the blockchain management platform 110 may determine whether a total quantity of payments made is equal to the quantity as indicated at step 312 by the user computing device 140. Based on determining that all payments have been made (or the loan used for purchase of the asset has been paid off with interest), the blockchain management platform may generate a new token for the asset. The new token may comprise an asset identifier, a wallet identifier of the user, and an indication that the asset is not associated with any loan. The new token may be included in a block and stored in the blockchain.

At step 324, the blockchain management platform 110 may execute a token burn for the initial token generated for the asset (e.g., at step 308). Executing the token burn may comprise generating a block comprising the initial token and an associated indication of a predefined wallet identifier. The block may be added to the blockchain. In an arrangement, the token and the indication of the predefined wallet identifier may be included in the same block as generated at step 320. The predefined wallet identifier may be associated with a wallet from which no transfers can be performed to other wallets. In this manner, the token would no longer be available to be transferred to any other wallets, and the token is effectively locked out from use.

Figure 4:
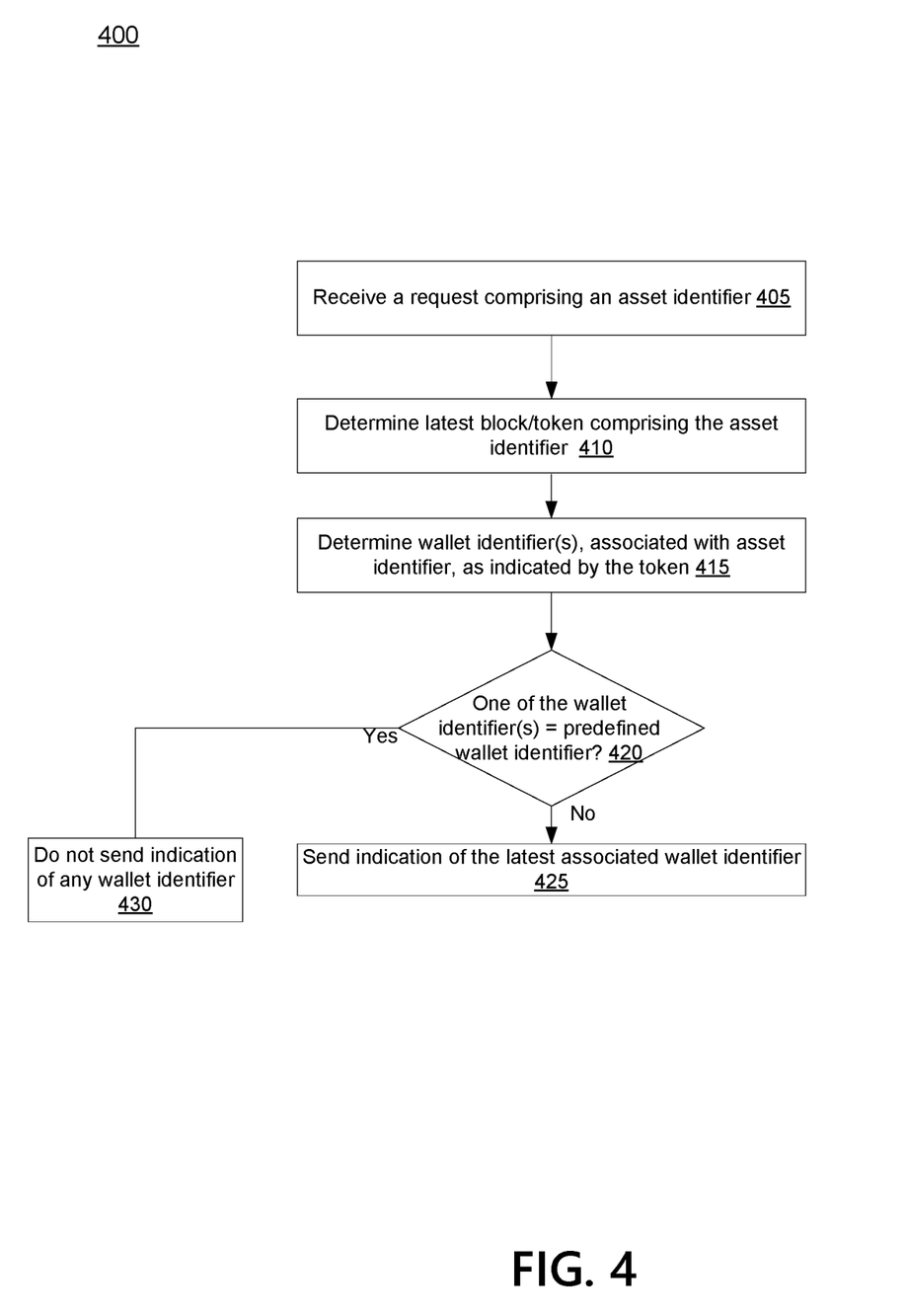
FIG. 4 shows an example method for determination of an identifier associated with an asset as recorded in the blockchain, in accordance with one or more example arrangements.

FIG. 4 shows an example method for determination of an identifier associated with an asset as recorded in the blockchain. At step 405, the blockchain management platform 110 may receive a request from a computing device (e.g., an enterprise user computing device 115 or a user computing device 140) comprising an asset identifier. At step 410, the blockchain management platform 110 may determine a latest block (and token(s) within the latest block) comprising the asset identifier. At step 415, the blockchain management platform 110 may determine wallet identifier(s), associated with the asset identifier, as indicated by a token in the block. At step 420, the blockchain management platform 110 may determine whether any of the wallet identifier(s) is the same as the predefined wallet identifier (e.g., associated with a wallet from which no transfers can be performed to other wallets). If any of the wallet identifier(s) is the same as the predetermined wallet identifier, the blockchain management platform 110 may not send the indication of any wallet identifier (e.g., the predetermined wallet identifier, or any other wallet identifier as indicated by the token) to the computing device (e.g., step 430). If the wallet identifier(s) are all different from the predetermined wallet identifier, the blockchain management platform 110 may send the indication of the latest associated wallet identifier to the computing device (e.g., step 425). In this manner, the blockchain management platform 110 may ensure that burned tokens are not used for determining current ownership status of an asset.

In an arrangement, the blockchain may also be used for storing client verification information. For example, client identification/verification may be performed by one financial institution (e.g., associated with the private network 130), and details associated with this verification may be stored in a block of the blockchain. Verification data may comprise a wallet identifier of the client, a location, credit information associated with the client, asset value corresponding to the client, etc. The verification data may be made available to other financial institutions that may want to access the information. In this manner, verification as performed by one financial institution may be made available to multiple other organizations, streamlining processing associated with loan/mortgage approvals.

As described above, the enterprise user computing device(s) 115 and the user computing device(s) 140 may correspond to lightweight network nodes while the blockchain management platform 110 may correspond to a full node. While the above examples are described in relation to a single full node (e.g., blockchain management platform 110) being used for blockchain management in a centralized network, in other arrangements, multiple full nodes (e.g., each with a corresponding local copy of the blockchain) may be used in a decentralized network. The full nodes may correspond to different financial institutions/banks that may form a collaborative network for recordation and transfer of assets between multiple clients.

For example, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

Figure 5:
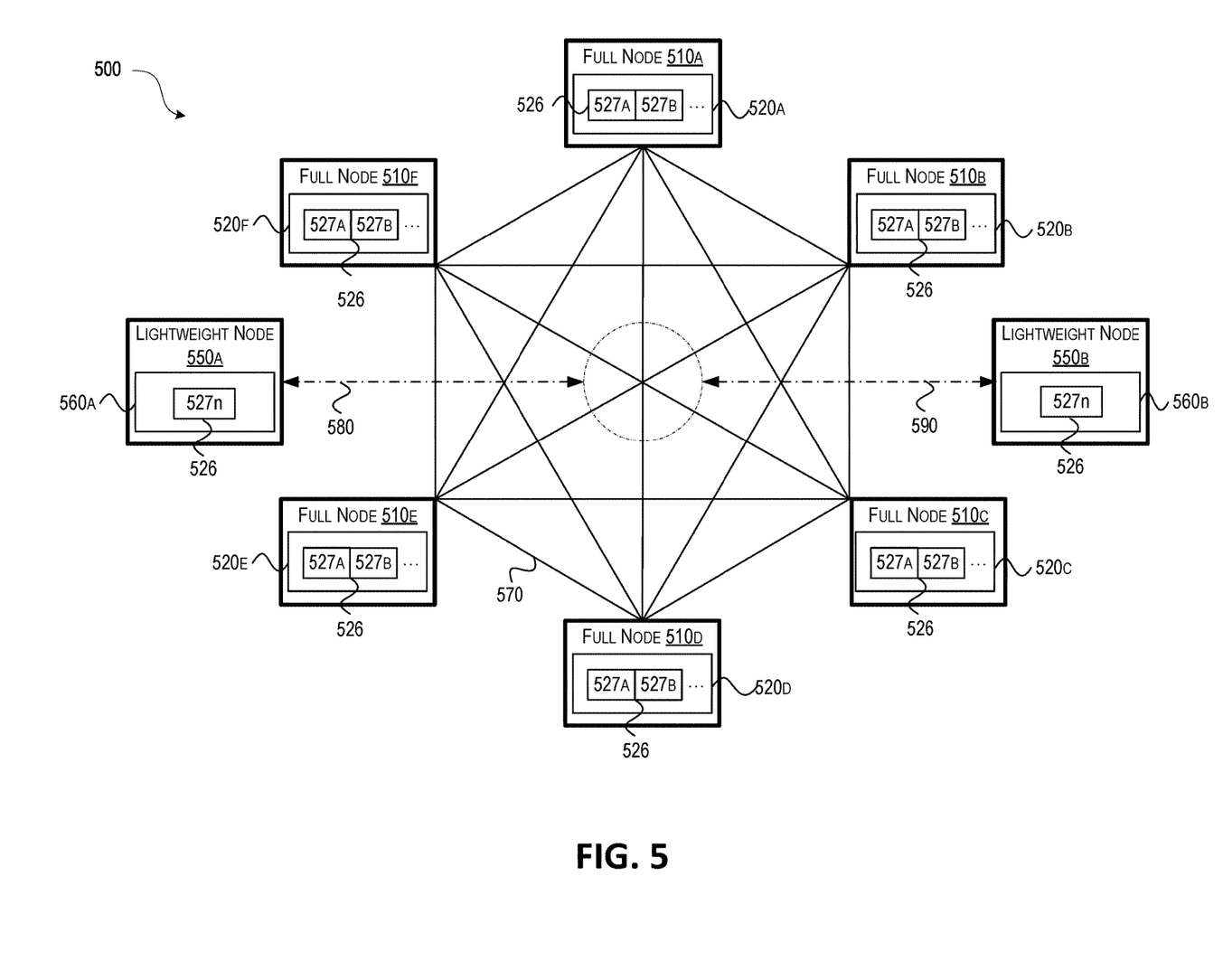
FIG. 5 shows an illustrative example of decentralized peer-to-peer (P2P) computer system that may be used in accordance with one or more illustrative aspects as described herein.

FIG. 5 depicts an illustrative example of decentralized P2P computer system 500 that may be used in accordance with one or more illustrative aspects described herein. Decentralized P2P computer system 500 may include a plurality of full node computing devices 510A, 510B, 510C, 510D, 510E, and 510F and lightweight node computing devices 550A and 550B. The full node computing device may be architecturally similar to the blockchain management platform 110 as shown in FIG. 1B. The lightweight node computing devices 550A and 550B be similar to the enterprise user computing device 115 and/or the user computing device 140. While a particular number of full node computing devices and lightweight node computing devices are depicted in FIG. 5, it should be understood that a number of full node computing devices and/or lightweight node computing devices greater or less than that of the depicted full node computing devices and lightweight node computing devices may be included in decentralized P2P computer system 500.

Accordingly, any additional full node computing devices and/or lightweight node computing devices may respectively perform in the manner described below in regard to full node computing devices 510A-510F and lightweight node computing devices 550A and 550B in decentralized P2P computer system 500.

Each of full node computing devices 510A-510F may operate in concert to create and maintain decentralized P2P network 570 of decentralized P2P computer system 500. In creating decentralized P2P network 570 of decentralized P2P computer system 500, processors, ASIC devices, and/or graphics processing units (e.g., GPUs) of each full node computing device 510A-510F may execute network protocols which may cause each full node computing device 510A-510F to form a communicative arrangement with the other full node computing devices 510A-510F in decentralized P2P computer system 500 and create decentralized P2P network 570. Furthermore, the execution of network protocols by the processors, ASIC devices, and/or graphics processing units (e.g., GPUs) of full node computing devices 510A-510F may cause full node computing devices 510A-510F to execute network functions related to blockchain 526 and thereby maintain decentralized P2P network 570.

Lightweight node computing devices 550A and 550B may request execution of network functions related to blockchain 526 in decentralized P2P network 570. In order to request execution of network functions, such as balance sheet transaction and/or smart contract operations, processors of lightweight node computing devices 550A and 550B may execute network commands to broadcast the network functions to decentralized P2P network 570 comprising full node computing devices 510A-510F. For example, the balance sheet transaction or the smart contract operation may be used to execute a cryptocurrency transfer (e.g., from a user wallet to a wallet associated with a financial institution), an asset transfer, etc., as described herein.

For example, lightweight node computing device 550A may request execution of a balance sheet transaction related to blockchain 526 in decentralized P2P network 570, which may entail a data transfer from a private/public key associated with lightweight node computing device 550A to a private/public key associated with lightweight node 550B. In doing so, processors of lightweight node computing device 550A may execute network commands to broadcast balance sheet transaction network function request 580 to decentralized P2P network 570. Balance sheet transaction network function request 580 may include details about the data transfer such as data type and amount, as well as a data transfer amount to full node computing devices 510A-201F of decentralized P2P network 570 for executing balance sheet transaction network function request 580. Balance sheet transaction network function request 580 may further include the public key associated with lightweight node computing device 550B. Processors of lightweight node computing device 550A may execute digital signature algorithms to digitally sign balance sheet transaction network function request 580 with the private key associated with lightweight node computing device 550A.

At decentralized P2P network 570, balance sheet transaction network function request 580 may be broadcasted to each of full node computing devices 510A-510F through execution of network protocols by full node computing devices 510A-510F. In order to execute balance sheet transaction network function request 580 and maintain internodal agreement as to the state of blockchain 526, processors, ASIC devices, and/or GPUs of full node computing devices 510A-510F may execute network protocols to receive broadcast of the network function through a decentralized P2P network 570 and from lightweight node computing device 550A. Processors, ASIC devices, and/or GPUs of full node computing devices 510A-510F may execute hash functions to generate a digest of balance sheet transaction network function request 580. The resultant digest of balance sheet transaction network function request 580, in turn, may be hashed with the block hash of the most immediately preceding block of blockchain 526. Processors, ASIC devices, and/or GPUs of full node computing devices 510A-510F may execute consensus algorithms to identify a numerical value (e.g., nonce) corresponding to the particular executed consensus algorithm and related to the digest that combines the digest of the balance sheet transaction network function request 580 and the block hash of the most immediately preceding block of blockchain 526.

For example, in embodiments in which the consensus algorithm is proof of work (e.g., PoW), processors, ASIC devices, and/or GPUs of full node computing devices 510A-510F may perform a plurality of hashing operations to identify a nonce that, when hashed with the digest that combines the digest of the balance sheet transaction network function request 580 and the block hash of the most immediately preceding block of blockchain 526, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 580, and block hash of the most immediately preceding block of blockchain 526.

In embodiments in which the consensus algorithm is proof of stake (e.g., PoS), a private key associated with one of full node computing devices 510A-510F may be pseudo-randomly selected, based on balance sheet holdings associated with the public keys of full node computing devices 510A-510F, to serve as the nonce. For example, through execution of the POS consensus algorithm, full node computing devices 510A-510F are entered into a lottery in which the odds of winning are proportional to a balance sheet amount associated the public key of each of full node computing devices 510A-510F, wherein a larger balance sheet amount corresponds to a higher probability to win the lottery. The POS consensus algorithm may cause a full node computing device from full node computing devices 510A-510F to be selected, and the public key of the selected full node computing device to be used as the nonce.

In embodiments in which the consensus algorithm is delegated proof of stake (e.g., DPoS), a group of delegates are chosen from full node computing devices 510A-510F by each of computing devices 510A-510F, wherein full node computing devices 510A-510F are allowed to vote on delegates based on balance sheet holdings associated with the respective public keys. Full node computing devices 510A-510F, however, may not vote for themselves to be delegates. Once the group of delegates are chosen, the group of delegates from full node computing devices 510A-510F select a public key associated with one of full node computing devices 510A-510F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 510A-510F are associated with a particular status and/or ongoing specific information associated with the respective public key of the full node computing devices. Each of full node computing devices 510A-510F receive a message through decentralized P2P network 570 based on network protocols. Based on the received message and particular status and/or ongoing specific information, each of full node computing devices 510A-510F perform computational tasks and transmit a response to the tasks to each of the other full node computing devices 510A-510F. A public key associated with a particular full node computing device from full node computing devices 510A-510F is selected by each of full node computing devices 510A-510F based on the response of the particular full node computing device best fulfilling criteria determined based on the network protocols.

The identification of the nonce enables processors, ASIC devices, and/or GPUs of the full node computing device from full node computing devices 510A-510F to create a new block with a block header (e.g., block hash), which is a digest that combines the digest of balance sheet transaction network function request 580, the block hash of the most immediately preceding block, and the identified nonce. Processors, ASIC devices, and/or GPUs of the full node computing device from full node computing devices 510A-510F may execute network protocols to add the new block to blockchain 526 and broadcast the new block to the other full node computing devices in the decentralized P2P network 570. In some arrangements, the new block may also be time-stamped at a time corresponding to the addition to blockchain 526. Furthermore, as a reward for adding the new block to blockchain 526, the full node computing device from full node computing devices 510A-510F may be allowed, per the network protocols, to increase a balance sheet holdings amount associated with itself by a predetermined amount. In some arrangements, each of full node computing devices 510A-510F may receive an equal portion of the data transfer amount specified by lightweight node computing device 560A for executing balance sheet transaction network function request 580. After the new block has been added to blockchain 526, balance sheet transaction network function request 580 may be considered to be executed and the data transfer from the private/public key associated with lightweight node computing device 550A to the private/public key associated with lightweight node 550B may be registered.

As stated above, in some arrangements, a plurality of network function requests may be broadcasted across decentralized network P2P network 570. Processors, ASIC devices, and/or GPUs of full node computing devices 510A-510F may execute network protocols to receive broadcast of each of the network functions, including balance sheet transaction network function request 580, through decentralized P2P network 570 and from the requesting entities, including lightweight node computing device 550A. Processors, ASIC devices, and/or GPUs of full node computing devices 510A-510F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 580. The root digest of the requested network function, in turn, may be hashed with the block hash of the most immediately preceding block of blockchain 526. Processors, ASIC devices, and/or GPUs of full node computing devices 510A-510B may execute consensus algorithms in the manner described above to identify a nonce corresponding to the particular executed consensus algorithm and related to the digest that combines the root digest of the requested network functions and the block hash of the most immediately preceding block of blockchain 526. The identification of the nonce enables processors, ASIC devices, and/or GPUs of the full node computing device from full node computing devices 510A-510F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 510A-510F may execute network protocols to add the new block to blockchain 526 and broadcast the new block to the other full node computing devices in the decentralized P2P network 570. In some arrangements, the new block may also be time-stamped at a time corresponding to the addition to blockchain 526. Furthermore, as a reward for adding the new block to blockchain 526, the full node computing device from full node computing devices 510A-510F may be allowed, per the network protocols, to increase a balance sheet holdings amount associated with itself by a predetermined amount. In some arrangements, each of full node computing devices 510A-510F may receive an equal portion of the data transfer amount specified by each of the network function requests. After the new block has been added to blockchain 526, each of the network functions requests, including balance sheet transaction network function request 580, may be considered to be executed and the data transfer from the private/public key associated with lightweight node computing device 550A to the private/public key associated with lightweight node 550B may be registered.

While the description provided above is made in relation to a balance sheet transaction involving lightweight node computing device 550A and lightweight node computing device 550B, it is to be understood that balance sheet transactions are not limited to lightweight node computing device 550A and lightweight node computing device 550B, but rather may be made across any of the full node computing devices and/or lightweight node computing devices in decentralized P2P system 500.

For another example, lightweight node computing device 550B may request a smart contract operation related to blockchain 526 in decentralized P2P network 570, which may facilitate a dual data transfer between a private/public key associated with lightweight node computing device 550B and a private/public key associated lightweight node computing device 550A. For example, the smart contract operation may correspond to an automatic payment transaction as described with respect to FIG. 3. Processors of lightweight node computing device 550B may execute network commands to broadcast smart contract operation network function request 590 to decentralized P2P network 570. Smart contract operation network function request 590 may include details about the data transfer such as data type and amount, as well as a data transfer amount to full node computing devices 510A-510F of decentralized P2P network 570 for executing smart contract operation network function request 590. Smart contract operation network function request 590 may further include the public key associated with the smart contract. Processors of lightweight node computing device 550B may execute digital signature algorithms to digitally sign smart contract operation network function request 590 with the private key associated with lightweight node computing device 550B.

At decentralized P2P network 570, smart contract operation network function request 590 may be broadcasted to each of full node computing devices 510A-510F through execution of network protocols by full node computing devices 510A-510F. In order to execute smart contract operation network function request 590 and maintain internodal agreement as to the state of blockchain 526, processors, ASIC devices, and/or GPUs of full node computing devices 510A-510F may execute network protocols to receive broadcast of the network function through a decentralized P2P network 570 and from lightweight node computing device 550B. Processors, ASIC devices, and/or GPUs of full node computing devices 510A-510F may execute hash functions to generate a digest of smart contract operation network function request 590. The resultant digest of smart contract operation network function request 590, in turn, may be hashed with the block hash of the most immediately preceding block of blockchain 526. Processors, ASIC devices, and/or GPUs of full node computing devices 510A-510F may execute consensus algorithms to identify a nonce corresponding to the particular executed consensus algorithm and related to the digest that combines the digest of smart contract operation network function request 590 and the block hash of the most immediately preceding block of blockchain 526.

The identification of the nonce enables processors, ASIC devices, and/or GPUs of the full node computing device from full node computing devices 510A-510F to create a new block with a block header (e.g., block hash), which is a digest that combines smart contract operation network function request 590, the block hash of the most immediately preceding block, and the identified nonce. Processors, ASIC devices, and/or GPUs of the full node computing device from full node computing devices 510A-510F may execute network protocols to add the new block to blockchain 526 and broadcast the new block to the other full node computing devices in the decentralized P2P network 570. In some arrangements, the new block may also be time-stamped at a time corresponding to the addition to blockchain 526. Furthermore, as a reward for adding the new block to blockchain 526, the full node computing device from full node computing devices 510A-510F may, per the network protocols, increase a balance sheet holdings amount associated with itself by a predetermined amount. In some arrangements, each of full node computing devices 510A-510F may receive an equal portion of the data transfer amount specified by lightweight node computing device 560A for executing smart contract operation network function request 590. After the new block has been added to blockchain 526, smart contract operation request 590 may be considered to be executed and the data transfer from the private/public key associated with lightweight node computing device 550B to the private/public key associated with the smart contract may be registered.

The smart contract may be configured to hold the data transfer from the private/public key associated with lightweight node computing device 550B until fulfillment of certain predetermined criteria hardcoded into the smart contract is achieved. The smart contract may be configured such that it serves as an intermediate arbiter between entities within the decentralized P2P network 570 and may specify details of a dual data transfer between entities.

Lightweight node computing device 550A may also request a smart contract operation related to blockchain 526 in decentralized P2P network 570, which may conclude the dual data transfer between a private/public key associated lightweight node computing device 550A and a private/public key associated with lightweight node computing device 550B. Processors of lightweight node computing device 550A may execute network commands to broadcast the smart contract operation network function request to decentralized P2P network 570. The smart contract operation network function request may include details about the data transfer such as data type and amount, as well as a data transfer amount to full node computing devices 510A-510F of decentralized P2P network 570 for executing the smart contract operation network function request. The smart contract operation network function request may further include the public key associated with the smart contract. Processors of lightweight node computing device 550A may execute digital signature algorithms to digitally sign the smart contract operation network function request with the private key associated with lightweight node computing device 550A.

At decentralized P2P network 570, the smart contract operation network function request may be broadcasted to each of full node computing devices 510A-510F through execution of network protocols by full node computing devices 510A-510F. In order to execute the smart contract operation network function request and maintain inter-nodal agreement as to the state of blockchain 526, processors, ASIC devices, and/or GPUs of full node computing devices 510A-510F may execute network protocols to receive broadcast of the network function through a decentralized P2P network 570 and from lightweight node computing device 550A. Processors, ASIC devices, and/or GPUs of full node computing devices 510A-510F may execute hash functions to generate a digest of the smart contract operation network function request. The resultant digest of the smart contract operation network function request, in turn, may be hashed with the block hash of the most immediately preceding block of blockchain 526. Processors, ASIC devices, and/or GPUs of full node computing devices 510A-510F may execute consensus algorithms to identify a nonce corresponding to the particular executed consensus algorithm and related to the digest that combines the digest of the smart contract operation network function request and the block hash of the most immediately preceding block of blockchain 526.

The identification of the nonce enables processors, ASIC devices, and/or GPUs of the full node computing device from full node computing devices 510A-510F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 510A-510F may execute network protocols to add the new block to blockchain 526 and broadcast the new block to the other full node computing devices in the decentralized P2P network 570. In some arrangements, the new block may also be time-stamped at a time corresponding to the addition to blockchain 526. Furthermore, as a reward for adding the new block to blockchain 526, the full node computing device from full node computing devices 510A-510F may be allowed, per the network protocols, to increase a balance sheet holdings amount associated with itself by a predetermined amount. In some arrangements, each of full node computing devices 510A-510F may receive an equal portion of the data transfer amount specified by lightweight node computing device 560A for executing the smart contract operation network function request. After the new block has been added to blockchain 526, the smart contract operation transaction network function request 590 may be considered to be executed and the data transfer from the private/public key associated with lightweight node computing device 550A to the private/public key associated with the smart contract may be registered.

When the smart contract receives the data value from each of lightweight node computing device 550A and lightweight node computing device 550B, the smart contract may transfer the data value from lightweight node computing device 550A to lightweight node computing device 550B and the data value from lightweight node computing device 550B to lightweight node computing device 550A.

While the description provided above was made in relation to lightweight node computing device 550A and lightweight node computing device 550B, it should be understood that any of the full node computing devices and lightweight node computing devices in decentralized system 500 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the computing network 100 described in regard to FIG. 1, decentralized P2P computer system 500 may provide technological advantages. For example, by distributing storage of blockchain 526 across multiple full node computing devices 510A-510F, decentralized P2P computer system 500 may not provide a single point of failure for malicious attack. In the event that any of the full node computing devices 510A-510F are compromised by a malicious attacker, decentralized P2P computer system 500 may continue to operate unabated as data storage of blockchain 526 and network processes are not controlled by a singular entity such as server infrastructure 110 of centralized computing system 100.

Furthermore, by utilizing blockchain data structure 526, decentralized P2P system 500 may provide technological improvements to conventional decentralized P2P systems in regard to byzantine fault tolerance stemming from an unreliable and/or malicious full node acting in decentralized P2P network 570 to undermine the work efforts of the other nodes. For example, in coordinating action between full node computing devices 510A-510F in relation to a similar computational task (e.g., consensus algorithm), a malicious node would need to have computational power greater than the combined computational power of each of the other full node computing devices in decentralized P2P network 570 to identify the nonce and thereby be able to modify blockchain 526. As such, the likelihood that a malicious node could subvert decentralized P2P network 570 and enter falsified data into blockchain 570 is inversely proportional to the total computational power of decentralized P2P system 500. Therefore, the greater the total computational power of decentralized P2P system 500, the less likely that a malicious node could subvert decentralized P2P network 570 and undermine blockchain 526.

Various examples as described herein provide a novel, flexible system for token management, in a blockchain environment, for recordation and transfer of assets. The blockchain system may be integrated across multiple organizations enabling seamless transfer of tokens and records. Further, the use of wallet identifiers, associated with an asset, within the tokens themselves may render the system more secure against unauthorized transfer of tokens to a wallet of a malicious actor. An additional layer of security may be provided by enabling only authorized nodes (e.g., full nodes, blockchain management platform 110) to issue or modify tokens.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:
1. A computing platform comprising
a processor; and
memory storing computer-readable instructions that, when executed by the processor, cause the computing platform to:
receive, from a computing device, metadata associated with an asset, wherein the metadata comprises at least an asset identifier;

generate a first token comprising the metadata and a first wallet identifier;
create a block, for inclusion into a blockchain, wherein the creating the block comprises hashing at least the first token and a previous hash value of a first immediately preceding block in the blockchain to generate a first hash value;
add the block to the blockchain;
receive, from the computing device, an indication of an asset split, wherein the indication of the asset split comprises at least the asset identifier;
generate at least two tokens, wherein:
  a second token, of the at least two tokens, comprises the asset identifier and a second wallet identifier, and
  a third token, of the at least two tokens, comprises the asset identifier and a third wallet identifier;
create at least two blocks, for inclusion into the blockchain, wherein the creating the at least two blocks comprises:
  hashing the second token and a second previous hash value of a second immediately preceding block in the blockchain to generate a second hash value, and
  hashing the third token and the second previous hash value of the second immediately preceding block in the blockchain to generate a third hash value;
adding the at least two blocks to the blockchain;
receiving a request for wallet identifiers associated with the asset identifier; and
based on querying the blockchain and further based on retrieving the second token and the third token from the at least two blocks, send indications of the second wallet identifier and the third wallet identifier.

2. The computing platform of claim 1, wherein the creating the at least two blocks further comprises including, within each of the at least two blocks, an indication of an association between the first token and a fourth wallet identifier.

3. The computing platform of claim 2, wherein the instructions, when executed by the processor, cause the computing platform to, based on querying the blockchain and based on determining the first token is associated with the fourth wallet identifier, not send indications of the first wallet identifier and the fourth wallet identifier.

4. The computing platform of claim 1, wherein an immediately preceding block is a current latest block of the blockchain.

5. The computing platform of claim 1, wherein the computing platform is associated with a node in a network comprising a plurality of nodes.

6. The computing platform of claim 5, wherein the adding the block to the blockchain comprising sending the block for addition to respective local copies of blockchains in the plurality of nodes.

7. The computing platform of claim 1, wherein the metadata further comprises one or more of a loan value, an interest rate, and an asset percentage.

8. The computing platform of claim 1, wherein the generating the at least two tokens and the creating the at least two blocks is based on execution of a smart contract stored in the blockchain.

9. The computing platform of claim 1, wherein the block comprises a nonce value that, when hashed with a digest that combines the first token and the hash value of the first immediately preceding block, generates the first hash value comprising a predetermined number of consecutive alpha-numerical characters at a predetermined position.

10. A method comprising:
receiving, at a computing platform and from a computing device, metadata associated with an asset, wherein the metadata comprises at least an asset identifier;
generating a first token comprising the metadata and a first wallet identifier;
creating a block, for inclusion into a blockchain, wherein the creating the block comprises hashing at least the first token and a previous hash value of a first immediately preceding block in the blockchain to generate a first hash value;
adding the block to the blockchain;
receiving, from the computing device, an indication of an asset split, wherein the indication of the asset split comprises at least the asset identifier;
generating at least two tokens, wherein:
  a second token, of the at least two tokens, comprises the asset identifier and a second wallet identifier, and
  a third token, of the at least two tokens, comprises the asset identifier and a third wallet identifier;
creating at least two blocks, for inclusion into the blockchain, wherein the creating the at least two blocks comprises:
  hashing the second token and a second previous hash value of a second immediately preceding block in the blockchain to generate a second hash value, and
  hashing the third token and the second previous hash value of the second immediately preceding block in the blockchain to generate a third hash value;
adding the at least two blocks to the blockchain;
receiving a request for wallet identifiers associated with the asset identifier; and
based on querying the blockchain and further based on retrieving the second token and the third token from the at least two blocks, sending indications of the second wallet identifier and the third wallet identifier.

11. The method of claim 10, wherein the creating the at least two blocks further comprises including, within each of the at least two blocks, an indication of an association between the first token and a fourth wallet identifier.

12. The method of claim 11, further comprising, based on querying the blockchain and based on determining the first token is associated with the fourth wallet identifier, not sending indications of the first wallet identifier and the fourth wallet identifier.

13. The method of claim 10, wherein an immediately preceding block is a current latest block of the blockchain.

14. The method of claim 10, wherein the computing platform is associated with a node in a network comprising a plurality of nodes.

15. The method of claim 14, wherein the adding the block to the blockchain comprising sending the block for addition to respective local copies of blockchains in the plurality of nodes.

16. The method of claim 10, wherein the metadata further comprises one or more of a loan value, an interest rate, and an asset percentage.

17. The method of claim 10, wherein the generating the at least two tokens and the creating the at least two blocks is based on execution of a smart contract stored in the blockchain.

18. The method of claim 10, wherein the block comprises a nonce value that, when hashed with a digest that combines the first token and the hash value of the first immediately preceding block, generates the first hash value comprising a predetermined number of consecutive alphanumerical characters at a predetermined position.

19. A non-transitory computer-readable medium storing computer-executable instructions that, when executed by a computer processor, cause a computing platform to:
  receive, from a computing device, metadata associated with an asset, wherein the metadata comprises at least an asset identifier;
  generate a first token comprising the metadata and a first wallet identifier;
  create a block, for inclusion into a blockchain, wherein the creating the block comprises hashing at least the first token and a previous hash value of a first immediately preceding block in the blockchain to generate a first hash value;
  add the block to the blockchain;
  receive, from the computing device, an indication of an asset split, wherein the indication of the asset split comprises at least the asset identifier;
  generate at least two tokens, wherein:
    a second token, of the at least two tokens, comprises the asset identifier and a second wallet identifier, and
    a third token, of the at least two tokens, comprises the asset identifier and a third wallet identifier;
  create at least two blocks, for inclusion into the blockchain, wherein the creating the at least two blocks comprises:
    hashing the second token and a second previous hash value of a second immediately preceding block in the blockchain to generate a second hash value, and
    hashing the third token and the second previous hash value of the second immediately preceding block in the blockchain to generate a third hash value;
  add the at least two blocks to the blockchain;
  receive a request for wallet identifiers associated with the asset identifier; and
  based on querying the blockchain and further based on retrieving the second token and the third token from the at least two blocks, send indications of the second wallet identifier and the third wallet identifier.

20. The computer-readable medium of claim 19, wherein the creating the at least two blocks further comprises including, within each of the at least two blocks, an indication of an association between the first token and a fourth wallet identifier, and wherein the instructions, when executed by a computer processor, cause the computing platform to:
  based on querying the blockchain and based on determining the first token is associated with the fourth wallet identifier, not sending indications of the first wallet identifier and the fourth wallet identifier.

* * * * *